US012658428B2

(12) United States Patent
Browne et al.

(10) Patent No.: US 12,658,428 B2
(45) Date of Patent: *Jun. 16, 2026

(54) USE OF SILICON WITH IMPURITIES IN SILICON-DOMINANT ANODE CELLS

(71) Applicant: Enevate Corporation, Irvine, CA (US)

(72) Inventors: Ian Browne, Orange, CA (US); Benjamin Park, Mission Viejo, CA (US); Jill Renee Pestana, Long Beach, CA (US)

(73) Assignee: Enevate Corporation, Irving, CA (US)

( * ) Notice: Subject to any disclaimer, the term of this patent is extended or adjusted under 35 U.S.C. 154(b) by 734 days.

This patent is subject to a terminal disclaimer.

(21) Appl. No.: 17/503,846

(22) Filed: Oct. 18, 2021

(65) Prior Publication Data

US 2022/0037653 A1 Feb. 3, 2022

Related U.S. Application Data

(63) Continuation of application No. 16/676,686, filed on Nov. 7, 2019, now Pat. No. 11,183,689.

(51) Int. Cl.
H01M 4/38 (2006.01)
H01M 4/133 (2010.01)
(Continued)

(52) U.S. Cl.
CPC ........... H01M 4/386 (2013.01); H01M 4/133 (2013.01); H01M 4/661 (2013.01); H01M 10/0525 (2013.01)

(58) Field of Classification Search
CPC ....... H01M 4/133; H01M 4/386; H01M 4/661
See application file for complete search history.

(56) References Cited

U.S. PATENT DOCUMENTS 6,235,427 B1 * 5/2001 Idota ....................... H01M 4/58
429/223
2010/0051858 A1 * 3/2010 Aramata ............... C01B 33/023
252/182.1

(Continued)

OTHER PUBLICATIONS

Notification of Transmittal of the International Search Report and the Written Opinion of the International Searching Authority, or the Declaration, mailed Dec. 17, 2020 for PCT Application No. PCT/US2020/058196; International Filing Date Oct. 30, 2020.

*Primary Examiner* — Osei K Amponsah
(74) *Attorney, Agent, or Firm* — McAndrews, Held & Malloy, Ltd.

(57) ABSTRACT

Systems and methods for use of silicon with impurities in silicon-dominant anode cells may include a cathode, an electrolyte, and an anode including an active material, where the anode active material includes silicon, and where an impurity level of the silicon may be more than 400 ppm. The impurity level of the silicon is more than 600 ppm. The impurity level may be for elements with an atomic number between 2 and 42. The silicon may have a purity of 99.90% or less. A resistance of the silicon when pressed into a 4 mm thick and 15 mm diameter pellet may be 25 kΩ or less. The active material may include silicon, carbon, and a pyrolyzed polymer on a metal current collector. The metal current collector may include a copper or nickel foil in electrical contact with the active material. The active material may include more than 50% silicon.

26 Claims, 6 Drawing Sheets

(51) Int. Cl.
　　H01M 4/66　　　　(2006.01)
　　H01M 10/0525　　(2010.01)

(56)　　　　　　　References Cited

U.S. PATENT DOCUMENTS

2011/0111303　A1*　5/2011　Kung ................... H01M 4/134
　　　　　　　　　　　　　　　　　　　　252/502
2012/0094176　A1*　4/2012　Neumann ......... H01M 10/0525
　　　　　　　　　　　　　　　　　　　　156/308.2
2013/0045420　A1*　2/2013　Biswal ..................... C25F 3/12
　　　　　　　　　　　　　　　　　　　　252/502

* cited by examiner

401 Mix active material slurry

403 Coat slurry on foil

405 Dry solvent

407 Optional Calendering

409 Pyrolysis

411 Punch, fabricate cell

413 Formation, test capacity

501 Mix active material

503 Coat slurry on polymer substrate

505 Dry solvent, optional calender process

507 Peel from polymer substrate

509 Cure, pyrolysis

511 Laminate active material on current collector

513 Cell fabrication, formation, test capacity

USE OF SILICON WITH IMPURITIES IN SILICON-DOMINANT ANODE CELLS

CROSS-REFERENCE TO RELATED APPLICATIONS/INCORPORATION BY REFERENCE

The present application is a continuation of U.S. patent application Ser. No. 16/676,686, filed Nov. 7, 2019, the disclosure of which is incorporated herein by reference in its entirety.

FIELD

Aspects of the present disclosure relate to energy generation and storage. More specifically, certain embodiments of the disclosure relate to a method and system for use of silicon with impurities in silicon-dominant anode cells.

BACKGROUND

Conventional approaches for battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for use of silicon with impurities in silicon-dominant anode cells, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
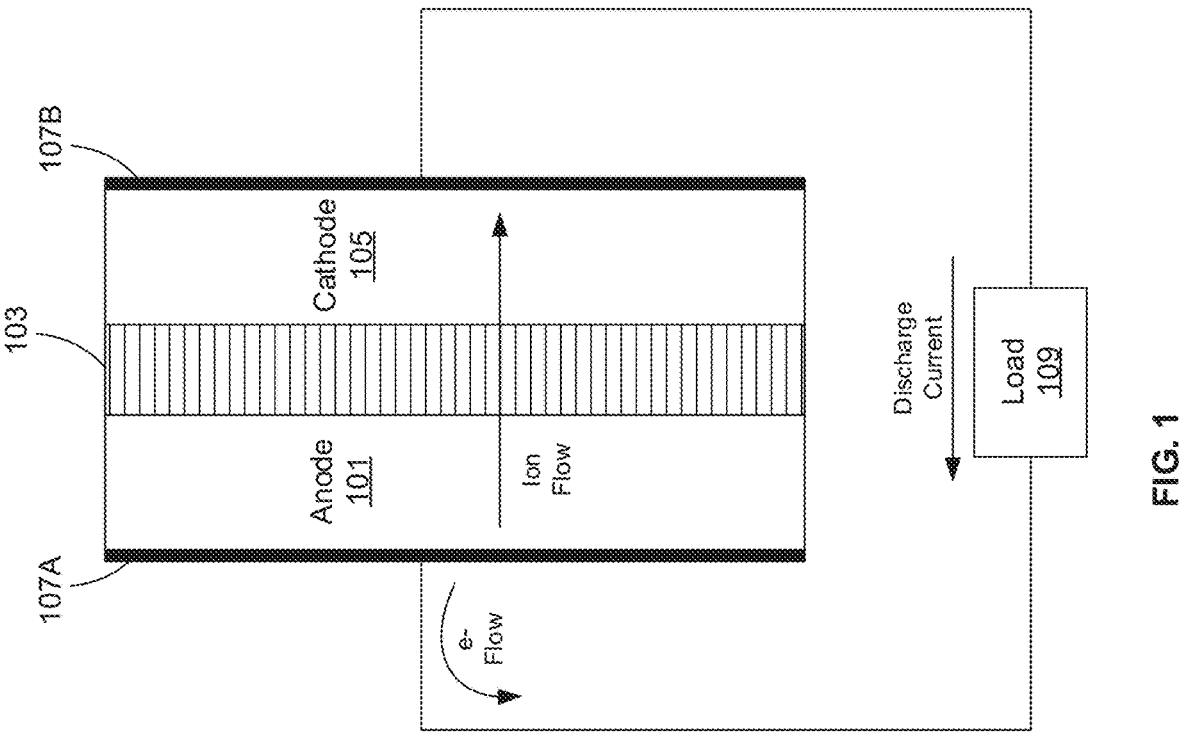
FIG. 1 is a diagram of a battery with a silicon-dominant anode, in accordance with an example embodiment of the disclosure.
Figure 1:
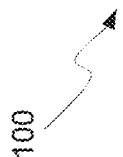

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 1078, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 1078. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon is being added as an active material or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

The silicon source for fabricating silicon-dominant anodes is important to cell performance. In this disclosure, silicon-dominant anodes with various impurity levels, which may impact anode resistivity, SEI formation, and material strength, are described.

Figure 2:
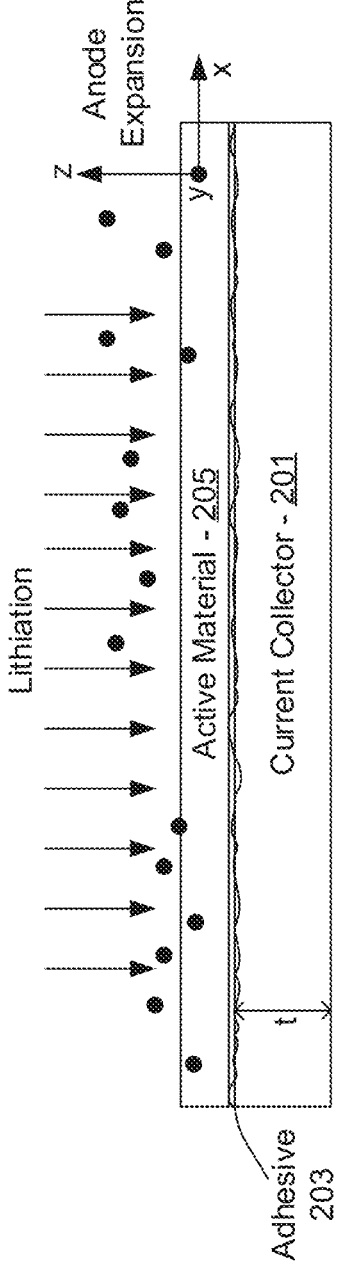
FIG. 2 illustrates an anode during lithiation, in accordance with an example embodiment of the disclosure.

FIG. 2 illustrates an anode during lithiation, in accordance with an example embodiment of the disclosure. Referring to FIG. 2, there are shown a current collector 201, adhesive 203, and an active material 205. It should be noted that the adhesive 203 may or may not be present depending on the type of anode fabrication process utilized, as the adhesive is not necessarily present in a direct coating process, and if present may be utilized before or after heat treatment. Furthermore, the layer thicknesses are not necessarily shown to scale, and the adhesive 203 is typically thin enough such that the active material 205 makes contact with the current collector 201 in various locations on the surface. In an example scenario, the anode active material 205 comprises silicon particles in a binder material and a solvent, where the active material is pyrolyzed to turn the binder into a glassy carbon that provides a structural framework around the silicon particles and also provides electrical conductivity. The active material may be coupled to the current collector 201 using the adhesive 203. The current collector 201 may comprise a metal film, such as copper, nickel, or titanium, for example, although other conductive foils may be utilized depending on desired tensile strength. The current collector 201 may comprise electrode perforations formed therein to allow lithiation to pass through from the side of the current collector 201 opposite to the active material 205.

FIG. 2 also illustrates lithium ions impinging upon and lithiating the active material 205 when incorporated into a cell with a cathode, electrolyte, and separator (not shown). The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 10 μm thick, such as 20 μm for copper, for example, while thinner foils may be less than 10 μm, such as 5-6 μm thick for copper.

In an example scenario, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

The current collector 201 may comprise electrode perforations formed therein to allow lithiation to pass through from the side of the current collector 201 opposite to the active material 205. This is shown further with respect to FIGS. 3-8.

Figure 3:
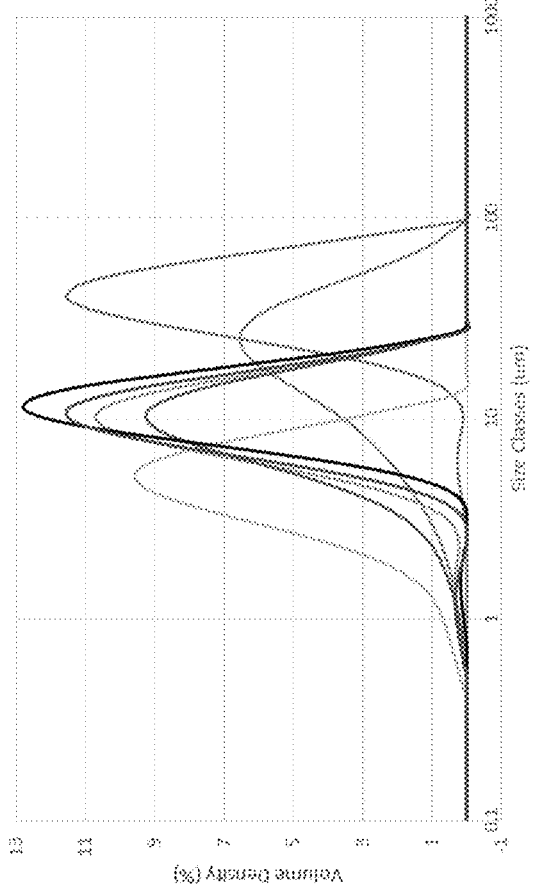
FIG. 3 shows silicon particles used for active material in silicon-dominant anodes and particle size distributions of various sources, in accordance with an example embodiment of the disclosure.
Figure 3:
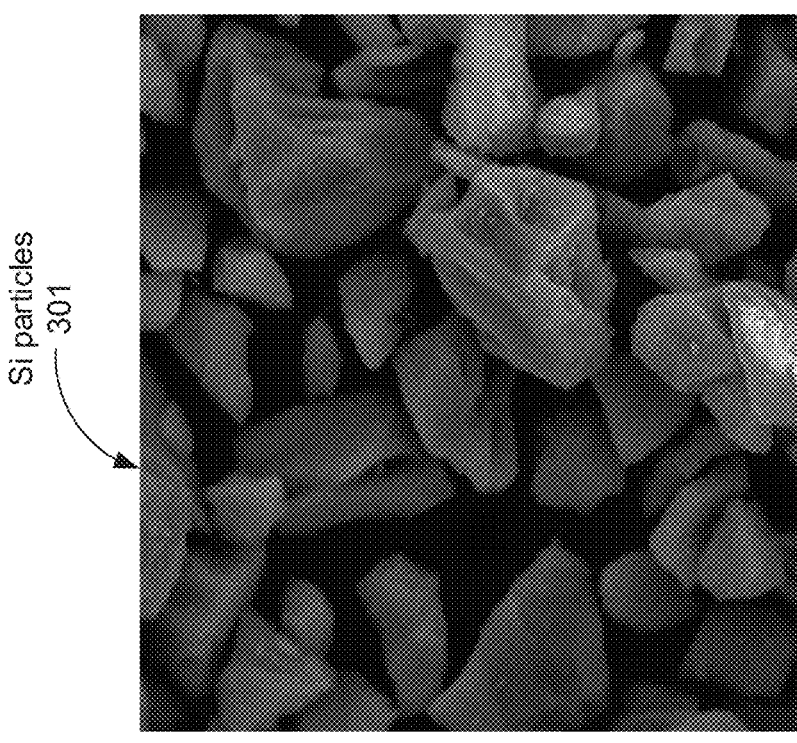

FIG. 3 shows silicon particles used for active material in silicon-dominant anodes and particle size distributions of various sources, in accordance with an example embodiment of the disclosure. Referring to FIG. 3, there is shown a scanning electron microscope (SEM) image of silicon particles 301 and a particle size distribution (PSD) plot for various silicon sources. As seen in the PSD plot, most silicon sources have peak size densities around 10 μm, with a couple outliers.

Figure 4:
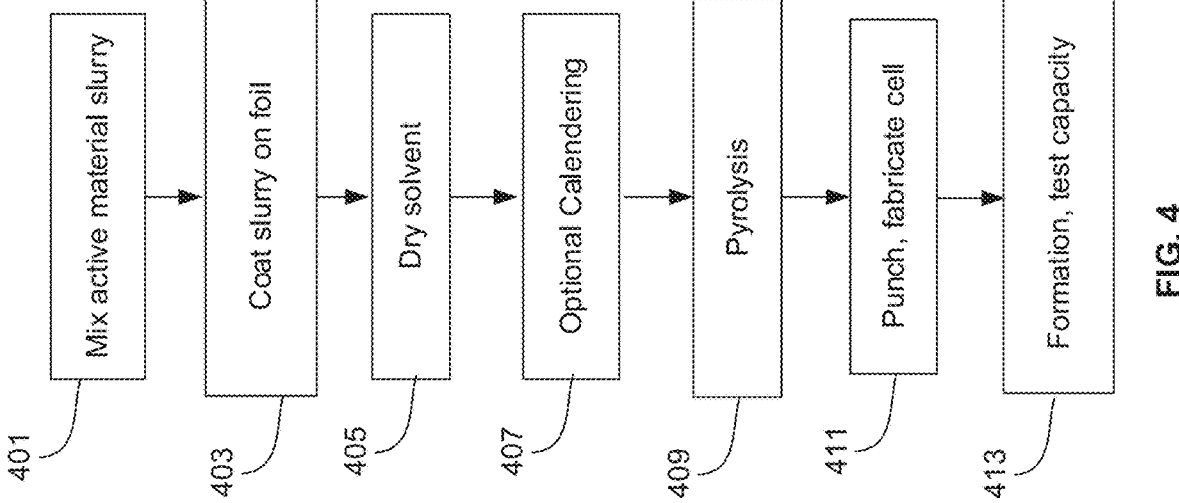
FIG. 4 is a flow diagram of a process for fabricating cells, in accordance with an example embodiment of the disclosure.

FIG. 4 is a flow diagram of a direct coating process for fabricating a cell, in accordance with an example embodiment of the disclosure. This process comprises physically mixing the active material, conductive additive, and binder together, and coating it directly on a current collector. This example process comprises a direct coating process in which an anode or cathode slurry is directly coated on a copper foil using a binder such as CMC, SBR, Sodium Alginate, PAI, PI and mixtures and combinations thereof. Another example process comprising forming the active material on a substrate and then transferring to the current collector is described with respect to FIG. 5.

In step 401, the raw electrode active material may be mixed using a binder/resin (such as PI, PAI), solvent, and conductive carbon. For example, for the anode, graphene/ VGCF (1:1 by weight) may be dispersed in NMP under sonication for, e.g., 1 hour followed by the addition of Super P (1:1:1 with VGCF and graphene) and additional sonication for, e.g., 45-75 minutes. Silicon powder with a desired particle size and impurity level, as discussed with respect to Table 1 below, may then be dispersed in polyamic acid resin (15% solids in N-Methyl pyrrolidone (NMP)) at, e.g., 800-1200 rpm in a ball miller for a designated time, and then the conjugated carbon/NM P slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness. Furthermore, cathode active materials may be mixed in step 401, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 403, the anode or slurry may be coated on a copper foil. Similarly, cathode active materials may be coated on a foil material, such as aluminum, for example. In one embodiment, the foil may comprise perforations through the material to allow flow-through of lithiation during operation of the cell.

The active material may undergo a drying in step 405 resulting in less than 12-18% residual solvent content. An optional calendering process may be utilized in step 405 where a series of hard pressure rollers may be used to finish the film/substrate into a smoother and denser sheet of material. In step 407, the foil and coating proceeds through a roll press for lamination.

In step 409, the active material may be pyrolyzed by heating to 500-800° C. such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 411. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 413, the cell may be subjected to a formation process, comprising initial charge and discharge steps to lithiate the anode, with some residual lithium remaining, and the cell capacity may be assessed. The perforations in the electrodes allows lithium to flow from double-sided cathodes to anodes even if one side of the cathode does not face an anode, thereby increasing cell capacity.

Figure 5:
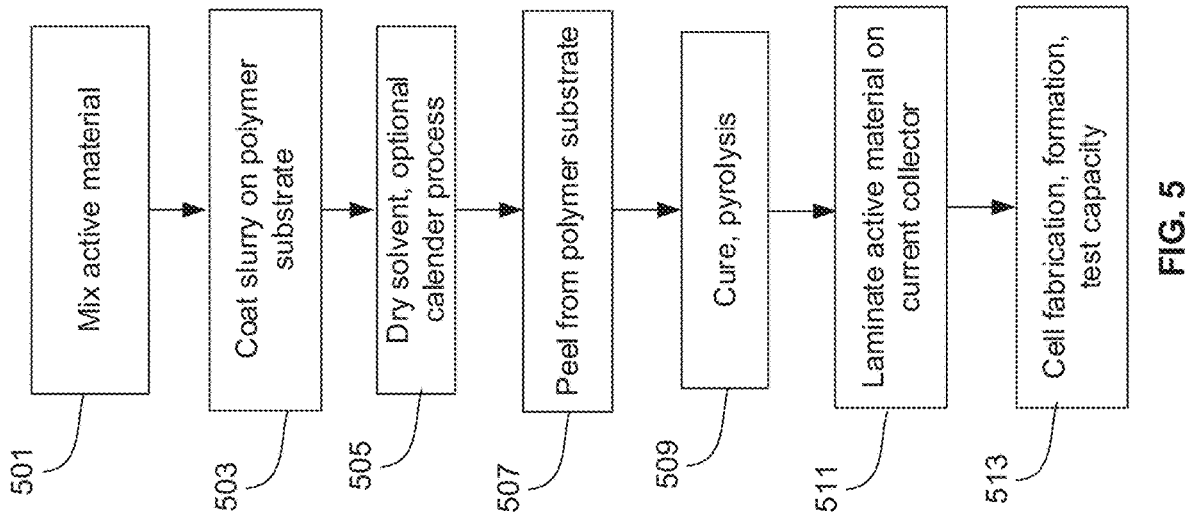
FIG. 5 is a flow diagram of an alternative process for fabricating cells, in accordance with an example embodiment of the disclosure.

FIG. 5 is a flow diagram of an alternative process for fabricating a cell, in accordance with an example embodiment of the disclosure. While the previous process to fabricate composite electrodes employs a direct coating process, this process physically mixes the active material, conductive additive, and binder together coupled with peeling and lamination processes.

This process is shown in the flow diagram of FIG. 5, starting with step 501 where the active material may be mixed with a binder/resin such as polyimide (PI) or polyamide-imide (PAI), solvent, the silosilazane additive, and optionally a conductive carbon. As with the process described in FIG. 4, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size and impurity level, as discussed with respect to Table 1 below, may then be dispersed in polyamic acid resin (15% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 20-40%. The particle size and mixing times may be varied to configure the active material density and/or roughness.

Furthermore, cathode active materials may be mixed in step 501, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 503, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 12-18% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 14-16 hours, 200-240° C. for 4-6 hour). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 511, the pyrolyzed material may be flat press laminated on the current collector, where for an anode, a copper foil may be coated with polyamide-imide with a nominal loading of 0.3-0.6 mg/cm$^2$ (applied as a 5-7 wt % varnish in NMP, dried 14-18 hours at 100-120° C. under vacuum) while for a cathode, the active material may be laminated to an aluminum foil, for example. The silicon-carbon composite film may be laminated to the coated foil using a heated hydraulic press (40-60 seconds, 250-350° C., and 3500-4500 psi), thereby forming the finished silicon-composite electrode. In another embodiment, the pyrolyzed material may be roll-press laminated to the current collector. In instances where the current collector does not have perforations before laminating with the active material, the completed electrodes may be perforated, using a punching process, for example.

In step 513, the electrodes may then be sandwiched with a separator and electrolyte to form a cell. The cell may be subjected to a formation process, comprising initial charge and discharge steps to lithiate the anode, with some residual lithium remaining, and the cell capacity may be assessed. The perforations in the electrodes allows lithium to flow from double-sided cathodes to anodes even if one side of the cathode does not face an anode, thereby increasing cell capacity.

TABLE 1

Gas discharge mass spectrometry (GDMS) results for various silicon source materials used to fabricate silicon-dominant anodes as discussed above. Each row is the concentration in parts per million (ppm) for the element listed in the different silicon sources.

| Element | Si 1 | Si 2 | Si 3 | Si 4 | Si 5 | Si 6 | Si 7 (Pure) | Si 8 |
|---|---|---|---|---|---|---|---|---|
| Li | <0.01 | <0.01 | <0.01 | <0.01 | <0.01 | <0.01 | <0.01 | <0.01 |
| Be | 0.13 | 0.09 | 0.14 | <0.01 | <0.01 | <0.01 | <0.01 | <0.01 |
| B | 12 | 28 | 29 | 8.9 | 1.3 | 9.8 | <0.01 | 8.2 |
| F | 10 | <5 | <5 | <5 | <5 | <5 | <5 | <5 |
| Na | 0.97 | 0.34 | 1.2 | 1.1 | 0.97 | 0.71 | <0.01 | 1.8 |
| Mg | 1.9 | 1.8 | 3.9 | 1.6 | 0.46 | 2 | <0.05 | 2 |
| Al | 130 | 600 | 580 | 9.2 | 7 | 160 | <0.05 | 15 |
| Si | Matrix | Matrix | Matrix | Matrix | Matrix | Matrix | Matrix | Matrix |
| P | 25 | 31 | 33 | 4.1 | 2.8 | 14 | 0.25 | 13 |
| S | 0.69 | 0.41 | 0.46 | 5.1 | 1.2 | 2.8 | <0.05 | 3.6 |
| Cl | 60 | 5 | 3.5 | 10 | 14 | 55 | 0.41 | 43 |
| K | <0.1 | 0.33 | <0.1 | 1.2 | 0.3 | <0.1 | <0.1 | <0.1 |
| Ca | 1.4 | 100 | 67 | 5.8 | <0.5 | 6.9 | <0.5 | 14 |
| Sc | <0.05 | <0.05 | <0.05 | <0.05 | <0.05 | <0.05 | <0.05 | <0.05 |
| Ti | 3.8 | 13 | 6.3 | 0.56 | 0.11 | 3 | <0.01 | 1.4 |
| V | 7.9 | 0.57 | 0.29 | 0.51 | <0.01 | 0.07 | <0.01 | 0.42 |
| Cr | 7.5 | 0.91 | 0.58 | 110 | 0.18 | 3.2 | <0.1 | 12 |
| Mn | 2.5 | 2.1 | 1.4 | 9.9 | <0.05 | 1.6 | <0.05 | 1.3 |
| Fe | 51 | 360 | 230 | 410 | 3.5 | 12 | 1.5 | 34 |
| Co | 0.08 | 0.17 | 0.1 | 1.9 | <0.01 | <0.01 | <0.01 | <0.01 |
| Ni | 4.5 | 0.54 | 0.48 | 51 | 0.38 | 1.2 | 0.3 | 1.7 |
| Cu | 1.7 | 1.2 | 2.3 | 6.3 | <0.05 | 18 | <0.05 | 0.69 |
| Zn | <0.1 | <0.1 | <0.1 | 2 | <0.1 | 0.14 | <0.1 | 0.71 |
| Ga | <0.05 | <0.05 | <0.05 | <0.05 | <0.05 | <0.05 | <0.05 | <0.05 |
| Ge | 4.9 | 3 | 3.2 | 1.1 | 2 | 16 | <0.1 | 29 |
| As | 0.58 | <0.1 | <0.1 | <0.1 | 3 | 70 | <0.1 | 37 |
| Se | <0.1 | <0.1 | <0.1 | <0.1 | <0.1 | <0.1 | <0.1 | <0.1 |
| Br | 1.8 | 2 | 1.4 | 2.5 | 1 | 1.9 | 0.55 | 2.5 |
| Rb | <0.05 | 0.6 | 0.5 | <0.05 | <0.05 | <0.05 | <0.05 | <0.05 |

TABLE 1-continued

Gas discharge mass spectrometry (GDMS) results for various
silicon source materials used to fabricate silicon-dominant anodes as discussed above.
Each row is the concentration in parts per million (ppm) for the element listed in the
different silicon sources.

| Element | Si 1 | Si 2 | Si 3 | Si 4 | Si 5 | Si 6 | Si 7 (Pure) | Si 8 |
|---|---|---|---|---|---|---|---|---|
| Sr | <0.05 | 1.3 | 0.86 | <0.05 | <0.05 | <0.05 | <0.05 | <0.05 |
| Y | <0.05 | 0.28 | 0.18 | <0.05 | <0.05 | <0.05 | <0.05 | <0.05 |
| Zr | 7.8 | 3.5 | 1 | 0.94 | <0.05 | <0.05 | <0.05 | <0.05 |
| Nb | <0.05 | 0.07 | <0.05 | <0.05 | <0.05 | 10 | <0.05 | <0.05 |
| Mo | 0.5 | 0.08 | <0.05 | 5 | <0.05 | 1.5 | <0.05 | 160 |
| Total | 337 | 1156 | 967 | 649 | 38 | 390 | 3 | 381 |
| Purity | 99.966 | 99.88 | 99.88 | 99.990 | 99.996 | 99.944 | 99.9997 | 99.961 |

The GDMS results in Table 1 show various impurity levels for elements from lithium (atomic number 3) up to molybdenum (atomic number 42) and the total concentration for these elements at the second to last row of each column. The last row is for total purity when considering all elements measureable by GDMS up to Uranium. As shown in the cell capacity retention results set forth in FIG. 6, the best results are obtained with silicon anodes with impurity levels above 400 ppm or with an overall purity of 99.9% or less. High purity silicon, Si 7 in the chart, also demonstrates good cell capacity retention too, but suffers from other issues, such as higher anode resistivity. In addition, high purity silicon may be more costly.

To test conductivity, pellets are formed from sources S2, S3, and S7 where about 1.00 gram of each Si powder is weighed and made into a pellet using pressure held at ~13.4 MPa (1938 psi) for 30 s. The resulting pellets are between 3.5 and 4 mm thick and 15 mm in diameter. The resistance of the S2 and S3 material is 15-25 kΩ, while S7 is not measureable by a multimeter, indicating >20 MΩ.

Figure 6:
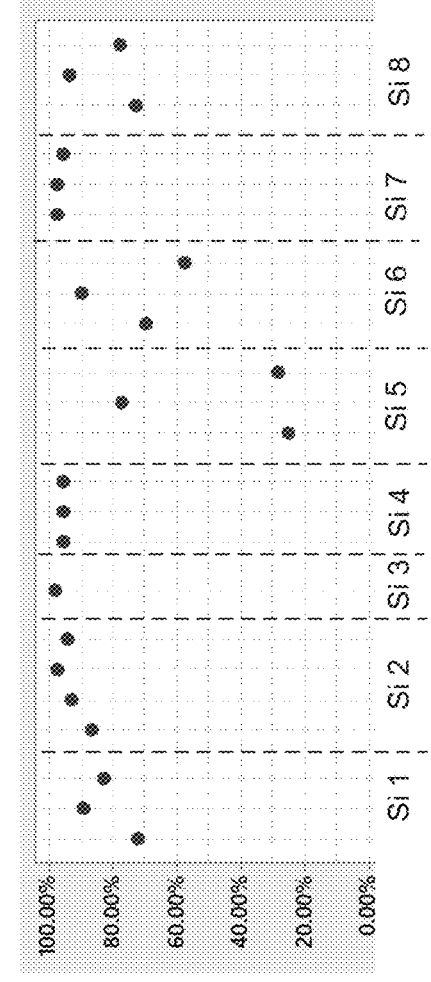
FIG. 6 illustrates cell capacity retention for cells with different silicon sources in silicon-dominant anodes, in accordance with an example embodiment of the disclosure.
Figure 6:
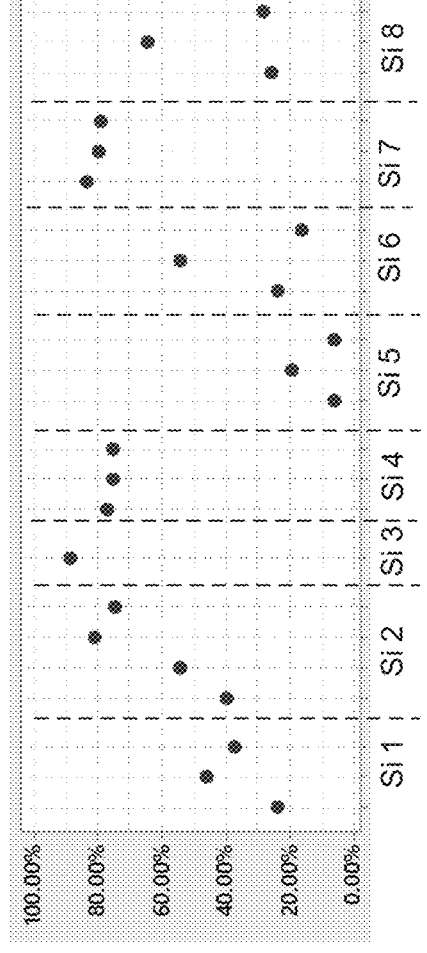

FIG. 6 illustrates cell capacity retention for cells with different silicon sources in silicon-dominant anodes, in accordance with an example embodiment of the disclosure. Referring to FIG. 6, there is shown cell capacity retention for cells at 50 cycles and at 200 cycles. The different data points for the various silicon sources indicate different slurry preparations for that source. For example, the four data points for silicon source Si 2 is for 1) as received, 2) with silane treatment, 3) a different stirring/wet process, and 4) wet treatment dried without stirring process.

As seen in the capacity retention results, the higher impurity level sources Si 2, Si 3, and Si 4 have the best retention along with the high purity silicon cells from source S7. Accordingly, a minimum impurity level of 400 ppm for elements of atomic number 2 through 42 yields the best cell capacity retention and overall cell performance or for an overall purity of 99.90% or less. In another example scenario, the best cell capacity retention is for silicon sources of 600 and higher for elements with atomic number 2 through 42. In another scenario, the best cell capacity may result for silicon sources of 400 and higher for all elements measureable by GDMS. In yet another scenario, the best cell capacity may result for silicon sources of 600 and higher for all elements measureable by GDMS.

In an example embodiment of the disclosure, a method and system is described for use of silicon with impurities in silicon-dominant anode cells. The battery may comprise a cathode, an electrolyte, and an anode, where the anode active material comprises silicon, and where an impurity level of the silicon may be more than 400 ppm. The anode active material may comprise 20% or more silicon by weight. The anode active material may comprise 50% or more silicon by weight. The impurity level of the silicon is more than 600 ppm. The impurity level may be for elements with an atomic number between 2 and 42. The silicon may have a purity of 99.90% or less. A resistance of the silicon when pressed into a 4 mm thick and 15 mm diameter pellet may be 25 kΩ or less. The anode active material may comprise silicon, carbon, and a pyrolyzed polymer on a metal current collector. The metal current collector may comprise a copper or nickel foil in electrical contact with the active material. The active material may comprise more than 50% silicon. The electrolyte may comprise a liquid, solid, or gel. The battery may comprise a lithium ion battery.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A battery, comprising:
a cathode;
an electrolyte; and an anode comprising a pyrolyzed binder material and 50% or more silicon by weight, wherein an impurity level of the silicon is more than 400 ppm; and wherein the pyrolyzed binder comprises thermally-decomposed carbon precursors.

2. The battery according to claim 1, wherein the impurity level of the silicon is more than 600 ppm.

3. The battery according to claim 1, wherein:

the impurity level is less than 1200 ppm; and the impurity level is a ppm sum for all elements with an atomic number between 2 and 42 excluding Ne, Ar, Kr, and Si.

4. The battery according to claim 1, wherein the silicon has a purity of 99.88% or greater.

5. The battery according to claim 1, wherein a resistance of the silicon when pressed into a 4 mm thick and 15 mm diameter pellet is 25 kΩ or less.

6. The battery according to claim 1, wherein:

the anode further comprises a metal current collector; and the pyrolyzed binder material and the silicon are on a surface of the metal current collector.

7. The battery according to claim 6, wherein the anode further comprises conductive carbon.

8. The battery according to claim 6, wherein the metal current collector comprises a copper or nickel foil in electrical contact with the pyrolyzed binder material and the silicon.

9. The battery according to claim 1, wherein the electrolyte comprises a liquid, solid, or gel.

10. The battery according to claim 1, wherein the anode, the electrolyte, and the cathode form a lithium ion battery cell.

11. A method comprising:

forming a mixture comprising a binder material and silicon particles;

coating a surface with the mixture; and pyrolyzing the mixture to form an anode active material comprising a pyrolyzed binder material and 50% or more silicon by weight, wherein an impurity level of the silicon is more than 400 ppm, wherein the pyrolyzing the mixture converts carbon precursors of a binder material to carbon.

12. The method according to claim 11, wherein coating the surface comprises coating a surface of a metal current collector with the mixture.

13. The method according to claim 11, wherein:

coating the surface comprises coating a surface of a substrate; and the method further comprises drying the mixture on the substrate to form a film of the mixture, and peeling the film from the substrate.

14. The method according to claim 11, wherein the anode active material comprises conductive carbon.

15. The method according to claim 11, wherein the impurity level of the silicon is more than 600 ppm.

16. The method according to claim 11, wherein:

the impurity level is less than 1200 ppm; and the impurity level is a ppm sum for all elements with an atomic number between 2 and 40 excluding Ne, Ar, Kr, and Si.

17. The method according to claim 11, wherein the silicon has a purity of 99.88% or greater.

18. The method according to claim 11, wherein a resistance of the silicon when pressed into a 4 mm thick and 15 mm diameter pellet is 25 kΩ or less.

19. The method according to claim 11, wherein coating the surface comprises coating a copper or nickel foil.

20. The method according to claim 11, further comprising forming a lithium ion battery cell comprising a cathode, an electrolyte, and anode active material.

21. The battery according to claim 1, wherein the pyrolyzed binder comprises thermally-decomposed carbon precursors form a carbon framework around particles of the silicon.

22. The method according to claim 11, wherein the pyrolyzing comprises heating the mixture to at or above 400° C.

23. The method according to claim 11, wherein the pyrolyzing comprises heating the mixture to at least one temperature in a range of 500-800° C.

24. The battery according to claim 6, wherein the metal current collector comprises perforations that permit lithiation through the metal current collector.

25. The method according to claim 12, comprising perforating the metal current collector to permit lithiation through the metal current collector.

26. The battery according to claim 1, wherein the 50% or more silicon by weight is provided by silicon particles having a size greater than 1 μm.

* * * * *